US009661271B1

(12) United States Patent
Rakshit

(10) Patent No.: US 9,661,271 B1
(45) Date of Patent: May 23, 2017

(54) MULTIPLE DISPLAY PLANES FOR PARTICIPANT COLLABORATION

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/954,287

(22) Filed: Nov. 30, 2015

(51) Int. Cl.
H04N 7/14 (2006.01)
H04N 7/15 (2006.01)
G06F 3/14 (2006.01)
H04N 5/247 (2006.01)

(52) U.S. Cl.
CPC ............. H04N 7/15 (2013.01); G06F 3/1415 (2013.01); G06F 3/1446 (2013.01); H04N 5/247 (2013.01)

(58) Field of Classification Search
USPC .......... 348/14.01, 14.08, 14.09, 14.07, 14.1, 348/14.12, 14.16, E13.023, E13.065, 348/208.8, 211.9
See application file for complete search history.

(56) References Cited

U.S. PATENT DOCUMENTS 7,280,172 B2 10/2007 Lee et al.
8,072,481 B1 12/2011 McNelley et al.
8,319,819 B2 11/2012 MacDonald et al.
8,390,668 B2 * 3/2013 Ferren ................. H04L 12/1827
 348/14.08
2010/0120470 A1 5/2010 Kim et al.
2014/0015743 A1 1/2014 Seo et al.
2014/0028596 A1 1/2014 Seo et al.
2014/0049464 A1 2/2014 Kwak et al.
2014/0078046 A1 3/2014 Seo et al.
2014/0098183 A1 4/2014 Smith et al.
2014/0184489 A1 * 7/2014 Ma .......................... G09G 5/37
 345/156
2014/0211309 A1 7/2014 Li et al.

OTHER PUBLICATIONS

"Perpendicular Mirrors", YouTube.com, https://www.youtube.com/watch?v=n4V3vT87L3w.

(Continued)

Primary Examiner — Yosef K Laekemariam
(74) Attorney, Agent, or Firm — Ronald A. Kaschak; Matthew M. Hulihan; Heslin Rothenberg Farley & Mesiti, PC

(57) ABSTRACT

Multiple display planes for participant collaboration are provided. An end of a first physical display is arranged adjacent to an end of a second physical display to define an angle. An example method includes detecting the angle, establishing, based on detecting the angle, a first physical display plane on the first physical display, a second physical display plane on the second physical display, and a plurality of virtual display planes on the first physical display and the second physical display, and presenting a different video feed of several video feeds in each of the first physical display plane, second physical display plane, and one or more virtual display planes of the plurality of virtual display planes.

20 Claims, 6 Drawing Sheets

(56) References Cited

OTHER PUBLICATIONS

"Technology . . . or magic? Samsung shows off video of transparent, flexible screen—with 3D so real it looks like you can touch it", DailyMail.com, Dec. 7, 2011, 20 pages, http://www.dailymail.co.uk/sciencetech/article-2070741/Samsungs-transparent-flexible-screen-3D-real-looks-like-touch-it.html.
"Rollable Display", Wikipedia.org, 3 pages, http://en.wikipedia.org/wiki/Rollable_display.
"CES: Plastic Logic shows off Papertab, a tablet as thin and flexible as paper", theinquirer.net, Jan. 8, 2013, 5 pages, http://www.theinquirer.net/inquirer/news/2234602/ces - plastic - logic - shows - off - papertab - a - tablet - as - thin - and - flexible - as - paper.
List of IBM Patents or Patent Applications Treated as Related, Nov. 30, 2015, pp. 1-2.
P., Daniel, "Samsung Flexible Display Patents Include Pull-Out and Rollable Concept Units", Mar. 7, 2012, 4 pages, http://www.phonearena.com/news/Samsung-flexible-display-patents-include-pull-out-and-rollable-concept-units_id27765.
Thrystan, "Samsung One Flexible Display Phone is Pulled Out of a Pen", Aug. 12, 2012, 5 pages, http://www.concept-phones.com/samsung/samsung-flexible-display-phone-pulled-pen/.
"Reflection and the Ray Model of Light—Lesson 2—Image Formation in Plane Mirrors", The Physics Classroom, http://www.physicsclassroom.com/class/refln/Lesson-2/Right-Angle-Mirrors, 4 pgs.
Konchem Touchlo Vunte Chepta, Episode 11, Dec. 13, 2014, https://www.youtube.com/watch?v=Wwu2Tm4Tdzl, 2 pgs.
Office Action in U.S. Appl. No. 14/797,241 dated Mar. 29, 2017, 31 pgs.

\* cited by examiner

MULTIPLE DISPLAY PLANES FOR PARTICIPANT COLLABORATION

BACKGROUND

Participants in a face-to-face meeting typically physically arrange themselves so that they can see one another. A common scenario is a 'round table' meeting in which multiple people sit together around a table and interact. In the telecommunications context, this physical arrangement is not possible when participants are at different locations. Teleconference/video-conferencing facilities enable interaction between multiple meeting participants but fail to adequately provide the feel of a physical round-table meeting in the virtual space when the conference involves multiple participants at different locations.

SUMMARY

Shortcomings of the prior art are overcome and additional advantages are provided through the provision of a computer-implemented method that includes detecting an angle between a first physical display and a second physical display, an end of the first physical display being adjacent to an end of the second physical display and defining the angle; based on detecting the angle, establishing (i) a first physical display plane on the first physical display, (ii) a second physical display plane on the second physical display, and (iii) a plurality of virtual display planes on the first physical display and the second physical display, wherein at least one virtual display plane of the plurality of virtual display planes is established on the first physical display and at least one virtual display plane of the plurality of virtual display planes is established on the second physical display; and presenting a different video feed of a plurality of video feeds in each of the first physical display plane, the second physical display plane, and a first virtual display plane of the plurality of virtual display planes.

Further, a computer system is provided that includes a memory and a processor in communications with the memory, wherein the computer system is configured to perform a method including detecting an angle between a first physical display and a second physical display, an end of the first physical display being adjacent to an end of the second physical display and defining the angle; based on detecting the angle, establishing (i) a first physical display plane on the first physical display, (ii) a second physical display plane on the second physical display, and (iii) a plurality of virtual display planes on the first physical display and the second physical display, wherein at least one virtual display plane of the plurality of virtual display planes is established on the first physical display and at least one virtual display plane of the plurality of virtual display planes is established on the second physical display; and presenting a different video feed of a plurality of video feeds in each of the first physical display plane, the second physical display plane, and a first virtual display plane of the plurality of virtual display planes.

Yet further, a computer program product including a computer readable storage medium readable by a processor and storing instructions for execution by the processor is provided for performing a method that includes: detecting an angle between a first physical display and a second physical display, an end of the first physical display being adjacent to an end of the second physical display and defining the angle; based on detecting the angle, establishing (i) a first physical display plane on the first physical display, (ii) a second physical display plane on the second physical display, and (iii) a plurality of virtual display planes on the first physical display and the second physical display, wherein at least one virtual display plane of the plurality of virtual display planes is established on the first physical display and at least one virtual display plane of the plurality of virtual display planes is established on the second physical display; and presenting a different video feed of a plurality of video feeds in each of the first physical display plane, the second physical display plane, and a first virtual display plane of the plurality of virtual display planes.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein use physical display devices to emulate, in a virtual context, the appearance and feel of real interaction in a common physical space. In a specific example, a virtual round-table gathering is enabled that conveys for the participants the feel that all participants are seated around a table during the gathering. This provides opportunities for enhanced and meaningful interaction among participants, for instance in a business setting with a round-table meeting, or a personal setting where distant family members dine together (in a virtual sense) with a feeling that they are seated around a common dining table. Other applications are possible.

In a specific implementation of aspects described herein, a user places two physical display devices end-to-end to create an acute (less than 90 degrees), perpendicular, or obtuse (between 90 and 180 degrees) interior angle between them, i.e. between their display surfaces, akin to an angle between pages of an open book. Based on the angular orientation of the two displays, software installed in a computer system establishes multiple physical and virtual display planes/surfaces on the displays. The established virtual and physical display planes can show any desired content, such as different participants of a video conference call. More specifically using this example, separate video feeds corresponding to different participants are received and displayed in respective different display planes of the physical and virtual display planes. At any point of time, the user can change the angle formed by the end-to-end physical displays, and a number of established virtual display planes will be changed automatically.

Figure 1:
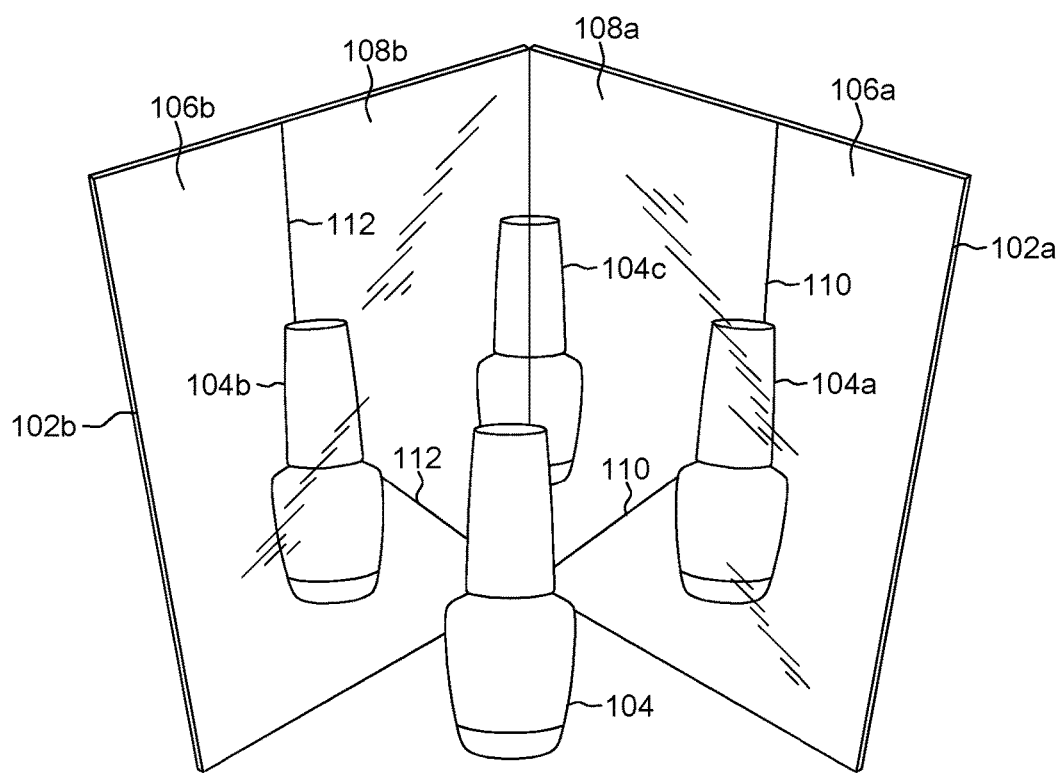
FIG. 1 illustrates a mirror-imaging example in which adjacent mirrors reflect images of an object.

The establishment of the multiple physical and virtual display planes on the physical display devices in accordance with aspects described herein is described using concepts of mirror imaging. FIG. 1 illustrates a mirror-imaging example in which adjacent mirrors reflect images of an object. If two mirrors are oriented end-to-end in a perpendicular (or other non-reflex angle) manner, a user viewing the reflections in the mirrors can view virtual surface areas. In FIG. 1, mirrors 102a and 102b are oriented end-to-end and with an angular orientation of about 90 degrees with respect to one another. Object 104 is placed in front of the two mirrors. The resulting reflections appear to show three virtual objects 104a, 104b, and 104c. First mirror 102a shows virtual object 104a in a first physical surface 106a as a reflection of object 104. First mirror 102a also shows a virtual surface 108a, which is a partial reflection of mirror 102b in mirror 102a. Virtual surface 108a has visible bottom and side edges 110, which are reflections of the bottom and left side edge of mirror 102b. Similarly, second mirror 102b shows virtual object 104b in a second physical surface 106b as a reflection of object 104, and shows a virtual surface 108b, which is a partial reflection of mirror 102a in mirror 102b. Virtual surface 108b has visible bottom and side edges 112, which are reflections of the bottom and right side edge of mirror 102a.

Based on the angle between the mirrors, a third virtual object 104c is shown, which is actually a composite of two reflected virtual objects. The first half of the composite appears in virtual surface 108a of mirror 102a and is a reflection (in mirror 102a) of half of virtual object 104b from mirror 102b. The second half of the composite appears in the virtual surface 108b of mirror 102b and is a reflection (in mirror 102b) of half of virtual object 104a from mirror 102a.

By changing the angle formed by the two mirrors, the number of virtual object reflections shown in the mirrors changes. Generally, for two mirrors placed at an angle $\theta \neq 0$ degrees, the number of virtual object reflections can be determined by $N=(360/\theta)-1$, where N is the number of images formed.

Figure 2A:
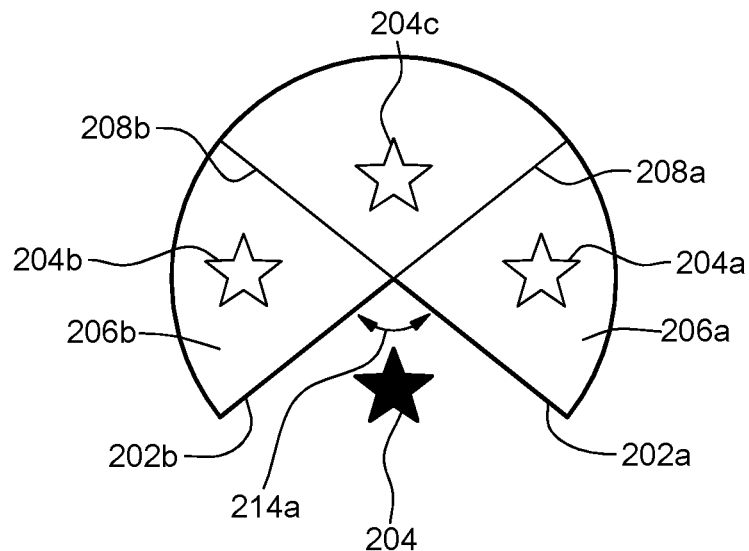
FIGS. 2A and 2B illustrate examples showing a relation between the angle between two physical surfaces and the display of multiple objects on physical and virtual surfaces.
Figure 2B:
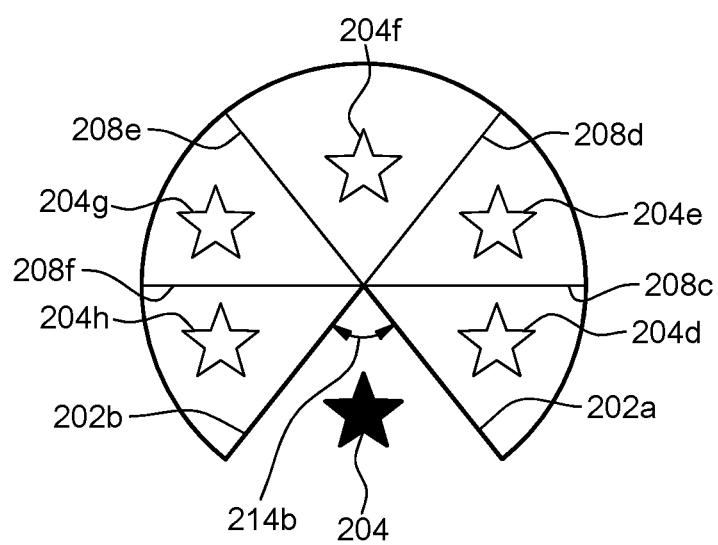

Consequently, a user can control the number of virtual surfaces by changing the angle between the mirrors. FIGS. 2A and 2B illustrate examples showing a relation between the angle between two physical surfaces and the display of multiple objects on physical and virtual surfaces. More specifically, FIGS. 2A and 2B present overhead depictions of physical displays oriented at 90 degrees and 60 degrees, respectively, and the resulting physical and virtual surfaces based on a mirroring property as described above. FIG. 2A presents the scenario described above with respect to FIG. 1. Physical displays 202a and 202b are oriented at an angle 214a of 90 degrees with respect to each other. Using the equation above, N=360/90−1=3. Hence, with physical object 204 placed in front of the physical surfaces 202a and 202b, virtual objects 204a and 204b appear as reflections of object 204 in physical surfaces 206a and 206b respectively, while virtual objet 204c appears as a composite of (i) a partial reflection (on physical display 202a) of surface 202b, and (ii) a partial reflection (on display 202b) of surface 202a. More specifically, the partial reflections are part of virtual surfaces 208a and 208b, which are the partial reflections of physical displays 202a and 202b in each other, as described above with reference to FIG. 1.

FIG. 2B presents a scenario with physical displays 202a and 202b oriented at an angle 214b of 60 degrees with respect to each other. Using the equation above, N=360/60−1=5. Hence, with physical object 204 placed in front of the physical surfaces 202a and 202b, virtual objects 204d and 204h appear as reflections of object 204 on surfaces 202a and 202b respectively, while virtual object 204e appears on a first virtual surface 208c, virtual object 204g appears on second virtual surface 208f, and virtual object 204f appears as a composite of two partial reflections of two virtual objects, and appears split across virtual surfaces 208d and 208e.

Described herein are facilities for establishing multiple physical and virtual display planes on two physical display devices, such as LCD, LED, OLED, or similar display devices of, e.g., a computer system. Two physical displays can be placed adjacent and end-to-end (or near end-to-end) to define an angular orientation with respect to each other. A user can change the angle as desired. Based on the angle, display of content on the physical displays can be controlled to provide both physical display planes and virtual display planes, the virtual planes providing programmatically created additional display surfaces. The content presented in the different physical display planes and virtual display planes can differ, and in specific embodiments can be different video feeds, for instance those used in establishing a video conference among multiple participants. Each video conference participant can be shown in a respective display plane (physical or virtual). As enhancements, when the displays are placed on-end and onto a table top, for instance, cameras can capture this surface on which the physical displays rest, extrapolate an extension/continuation of the surface, and superimpose appropriate portions of that extrapolated surface over portions of the video feeds to provide to a user viewing the displays a look and feel like the participants and user are situated in the same environment.

Figure 3:
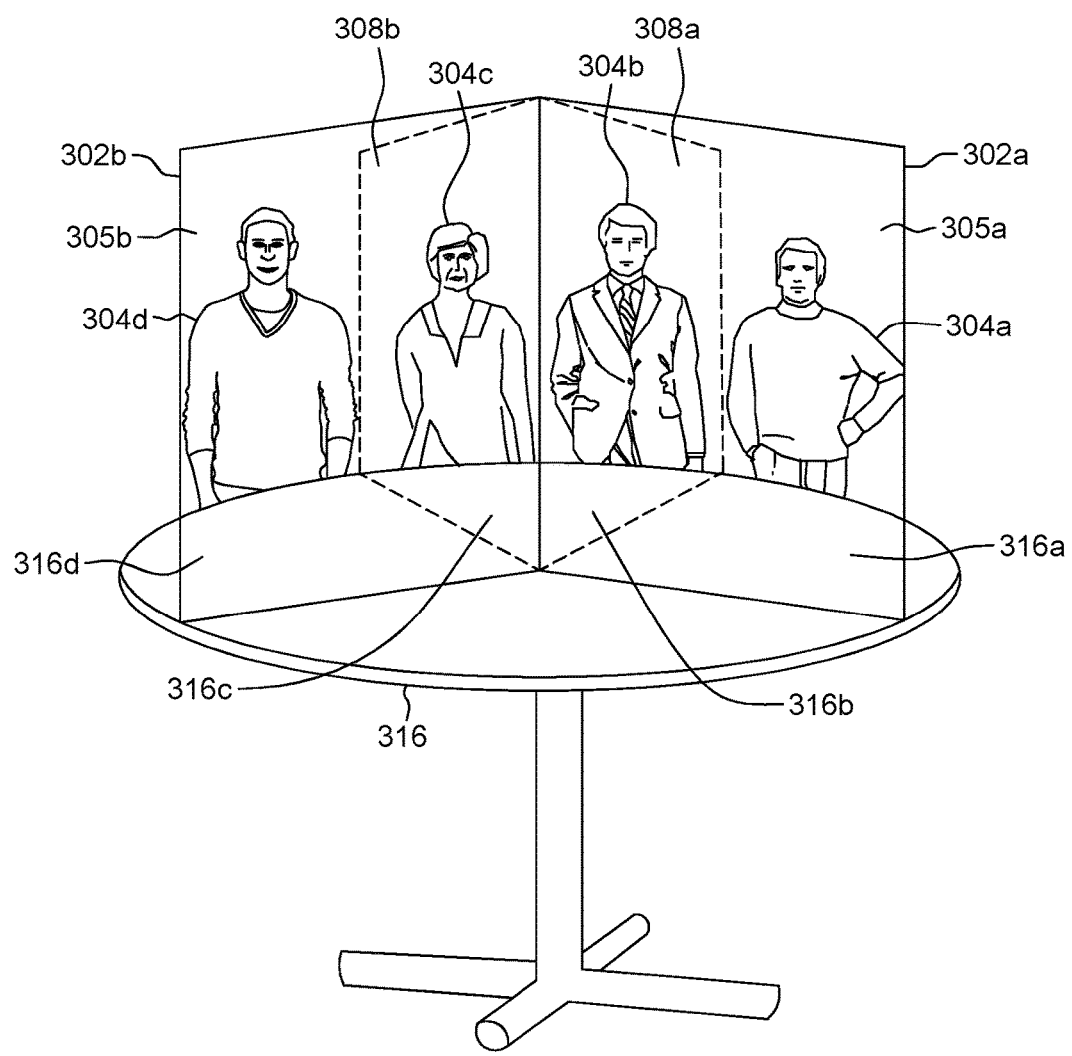
FIG. 3 depicts an example of a virtual round-table meeting involving multiple participants in which video feeds are presented on multiple display planes, in accordance with aspects described herein.

A specific example is depicted with reference to FIG. 3, which depicts an example of a virtual round-table meeting involving multiple participants in which video feeds are presented on multiple display planes, in accordance with aspects described herein. This example includes five participants—four are remote participants joining the meeting by video-conference, and the fifth participant, the "viewer", is the one viewing the displays on the table. During the meeting, displayed in each display plane (virtual & physical) will be a respective individual video feed from a video conference system or by direct connection to the individual sources of the video feeds. Initially, based on the number of participants, the viewer (not pictured) can arrange the displays to tailor the angle formed by the two physical displays, and accordingly the system will establish the appropriate number of physical and virtual planes for displaying the participants (and optionally other content). Then individual video feeds will be plotted on each display surface.

Referring to the specific example of FIG. 3, physical displays 302a and 302b of one or more computer systems are placed on-end and adjacent to each other to form an angle therebetween. The system can detect this angular orientation using any appropriate hardware/software technique, for instance by proximity detection via proximity sensors and/or cameras installed in/with one of more of the physical displays or separately provided. Software can then establish physical display planes 305a and 305b and multiple virtual display planes, in this example virtual display planes 308a and 308b. Dashed lines in FIG. 3 represent 'edges' of virtual display planes 308a and 308b.

Thus, physical display 302a presents a physical display plane 305a (akin to the primary reflection area showing object 104a in FIG. 1) and one (in this example) virtual display plane 308a, while physical display 302b presents a physical display plane 305b (akin to the primary reflection area showing object 104b in FIG. 1) and one (in this example) virtual display plane 308b. Each physical display 302a, 302b therefore presents multiple display planes (one physical and one virtual) that provide a logical separation for the display of different content. In these examples, the different content includes different live video feeds from cameras of different meeting participants 304a, 304b, 304c, 304d, though the content could be any type of content desired. Each virtual display plane and the two physical display planes are considered individual display planes for displaying differing content.

Should the number of participants change, or should the viewing user desire additional or fewer virtual display planes, for instance to show meeting content other than a live video feed of a participant, the user can reposition one (or both) displays to change their angular orientation with respect to each other. The software can detect this and adjust accordingly to provide additional or fewer virtual display planes.

As another example, if there were only three remote participants instead of four, one participant could be placed in first physical display plane 305a, another placed in second physical display plane 305b, and the third placed partially in virtual display plane 308a and partially in virtual display plane 308b, i.e. spanning the two, as depicted in the examples of FIGS. 1 and 2A.

Although not pictured, another camera may capture a live video feed of the viewing user and provide the video feed to the other participants, who may or may not be utilizing an analogous dual-display setup providing aspects of the virtual meeting as described herein.

Displays 302a and 302b are part of and/or in communication with one or more computers. Software executing on one (or more) such computer(s) can allow the viewing user to change which display plane displays which content, for instance to position each participant in a desired display plane of the physical and virtual display planes. The user can do this by, for example, an interface to map each received live video feed to a respective display plane. Absent the user explicitly mapping the content to the display planes, a preconfigured or default mapping could be applied, for instance one that places the live video feeds onto the display planes according to the order in which the live video feeds are received by the computer (such as filling the display planes sequentially from left to right as new participant feeds are received). If any display planes are unused, a configuration setting can specify the content to display in the unused display plane(s). As examples, it can show other video content (like a presentation that the participants can view), or it is left blank. Alternatively, the display plane can be removed from the physical display and one or more other display planes can be expanded.

With the physical displays set and the display planes established, the meeting progresses and the viewing user views each of the participants. In this example, the physical displays are placed on-end onto table 316. As an enhancement, the system can acquire images of a scene proximate the physical displays 302a, 302b, the scene including features like table 316 and edges thereof. The system can then extrapolate an extension of the feature. In FIG. 3 by example, the system can approximate a size of the table based on the radius of curvature of the table as detected by imaging the scene proximate the displays. The system can extrapolate (optionally taking into account the viewing user's viewing direction based on facial recognition and/or gaze tracking technology) an extension of the table, e.g. the positioning and dimensions of the areas of the table that the viewing user would see if the physical displays were not present. The system can then display, on the physical displays, the extrapolated extension, and more specifically present in one or more of the display planes respective portion(s) of the extrapolated extension of the feature. In FIG. 3, the system presents portions 316a, 316b, 316c, and 316d, representing extrapolated areas of table 316, in display planes 305a, 308a, 308b, and 305b, respectively, by overlaying the live video feeds presented in those display planes with some of the extrapolated extension of table 316. In an example in which camera(s) acquire images of the viewing user for presentation as a live video feed to the other participants of the meeting, these images can serve as the images on which the recognition and extrapolation of features of the scene are based. This recognition and extrapolation may alternatively or additionally be based on acquiring images from other camera(s).

Recent developments in display hardware have produced flexible displays that can roll, bend, or fold. Such flexible displays may be made of "electronic paper" or a thin, flexible plastic substrate incorporating organic light emitting diode (OLED) technology, as examples. Flexible displays may roll and/or pull-out from a computer system, for instance. Accordingly, the two physical displays described herein may be physically separate display devices as described above, or may be two physical displays or display portions of a single flexible display. In particular embodiments, a user may flex (bend) a portion of a flexible display of a computer system. The applied flexion may be detected and compared to a predefined threshold for triggering provision of aspects described herein, for instance establishment of multiple physical and virtual display planes across the two portions of the flexible display formed by the bending of the flexible display. Sensor(s) capable of detecting bending of the flexible display and installed in the display and/or computer system can identify the level of flexion/bending being applied to the display. Based on the bending, software of the computer system can determine a bending angle and position.

The following is an example sequence providing aspects described herein applied to a flexible display. Initially a bending stress or other flexion-detecting sensor installed in the flexible display identifies a level of stress/flexion applied to various portion(s) of the flexible display. Various technologies exist for detecting an amount of flexion being applied to a flexible display. In some examples, one or more sensors detect the degree of bending applied to various points of the flexible display. The character of the flexion (angle, curvature, location, force, etc.) may all be determined. The angle of bend may be determined based on an amount and/or radius of curvature exhibited in an area about the bend line. Additionally or alternatively, based on the level and locations of stress, software will determine the location of the bending line and once the bending line is identified, and based on applied stress-level, software installed in the device determines the bending angle, i.e. an angle between the two faces being bent toward each other along the bend line. As another example, proximity sensors determine proximity of areas of the display with respect to each other and a bending angle is determined based on this.

The bend line defines and separates two portions of the physical flexible display, each portion being considered an individual physical display with capability, in accordance with aspects described herein, for each of these physical displays to display physical and virtual planes. As described above, software can establish on each of the two physical displays a respective physical display plane and virtual display plane(s), and the number of virtual plane(s) can depend on the angular orientation of the two displays, e.g. angle defined by the magnitude of the bend applied to the flexible display to form the two physical displays. A multi-party video conference can be established, software installed on a computer of which the flexible display is a part can identify each video feed individually and display each video feed in a respective display plane. As above, a user can change the angle of the bend, based on the number of participants or otherwise, and the participants will be shown in the display planes accordingly.

Figure 4:
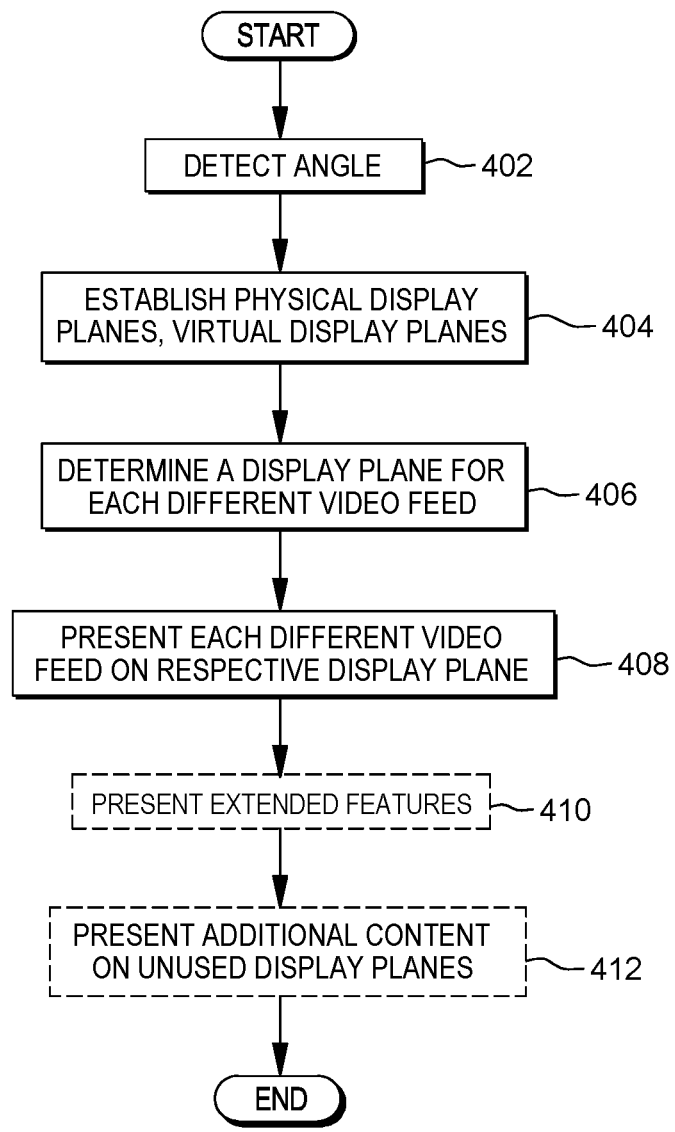
FIG. 4 depicts an example process for presenting video feeds on physical displays, in accordance with aspects described herein.

FIG. 4 depicts an example process for presenting video feeds on physical displays, in accordance with aspects described herein. The process may be performed by a computer system having, using, or being in communication with physical displays of one or more physical display devices. The process begins by detecting an angle between a first physical display and a second physical display (402). As noted above, the first and second physical displays may be separate physical display devices or may be part of one physical display device, such as a flexible display. An end of the first physical display is adjacent to an end of the second physical display and defines the angle. Detecting the angle can include determining the angle based on signals from proximity devices of the first physical display and second physical display, such as proximity sensors, cameras, or the like, and/or determined by flexion sensors. Based on detecting the angle, the process continues by establishing physical display planes and virtual display planes (404) as described herein. For example, the process establishes a first physical display plane on the first physical display, a second physical display plane on the second physical display, and a plurality of virtual display planes on the first physical display and the second physical display, with one or more virtual display planes being established on the first physical display and one or more virtual display planes being established on the second physical display. In some examples, the number of virtual display planes depends on the detected angle, where a smaller angle dictates that a greater number of virtual display planes be established.

The process continues by determining a display plane for each different video feed of several video feeds (406). Each different video feed is to be presented (at least partially) in a respective display plane of the first physical display plane, second physical display plane, and at least one of the multiple virtual display planes. This determining may be based on (i) a pre-configured default, such as a default dictating that the received video feeds be placed in succession across the display planes according to the order in which they are initially received, or (ii) a mapping, by a user, of each different video feed to a respective display plane of the first physical display plane, second physical display plane, and at least one virtual display plane.

The different video feeds are then presented on a respective display plane of the first physical display plane, the second physical display plane, and at least one virtual display plane (408). Each different video feed of the plurality of received video feeds may be from a respective different camera of a set of cameras at different locations remote from each other. In specific examples, these cameras acquire live images/video of meeting participants at different locations. In this manner, the video feed presented in the first physical display plane can include a live video feed of a first video-conference participant, the video feed presented in the second physical display plane can include a live video feed of a second video-conference participant, and the video feed presented in a virtual display plane can include a live video feed of a third video-conference participant, where the establishing the display planes and the presenting the video feeds thereon implement a virtual round-table meeting among a user and the first, second, and third video-conference participants.

In some examples, a video feed is presented spanning the first and second physical displays in a pair of adjacent virtual display planes, each virtual display plane of the paid being on a different physical display.

The process of FIG. 4 can optionally include additional steps. For instance, the process can continue by presenting extended features (410), such as superimposed, added, or augmented content in conjunction with portions of the content (video feed(s) in some examples) displayed in one or more display planes. As a specific example described herein, the presentation of the extended features can include imaging a scene proximate the first and second physical displays, extrapolating an extension of a feature of the scene (such as a table), and for each display plane of the first physical display plane, second physical display plane, and one or more virtual display planes, presenting a respective portion of the extrapolated extension of the feature, where the presenting provides to a viewer continuity of the feature (e.g. table) in the first physical display plane, second physical display plane, and virtual display plane(s).

Additionally or alternatively, the process may optionally present additional/supplemental content in unused display planes (412). The additional content can be meeting content, a slide presentation, documents, reports, or any other content desired. An unused display plane may be one that is established but not populated with a video feed from a participant. It is noted that an unused display plane(s) may have been established for any of various reasons. It some examples is may be unused based on absence of an anticipated participant, though in other examples the virtual display plane in which the additional content is presented may have been established with the intent that the plane by used for additional/supplemental content.

The two physical displays need not be physically separate components. In some embodiments, the first physical display and the second physical display are part of a single flexible display to which flexion is applied, the flexion imparting a bend in the flexible display along a bend line forming the angle and defining (i) the first physical display in a first region of the flexible display and (ii) the second physical display in a second region of the flexible display.

Processes described herein may be performed singly or collectively by one or more computer systems, such as computer system(s) described below with reference to FIG. 5. In some examples, such a computer system that performs process(es) described herein is a computer system that is part of, includes, or uses one or more physical display devices. In other examples, a remote computer system in communication with such computer system performs process(es) described herein. As a third possibility, a combination of the (i) computer system including/using the one or more physical display devices and (ii) remote computing system(s) perform process(es) described herein.

Figure 5:
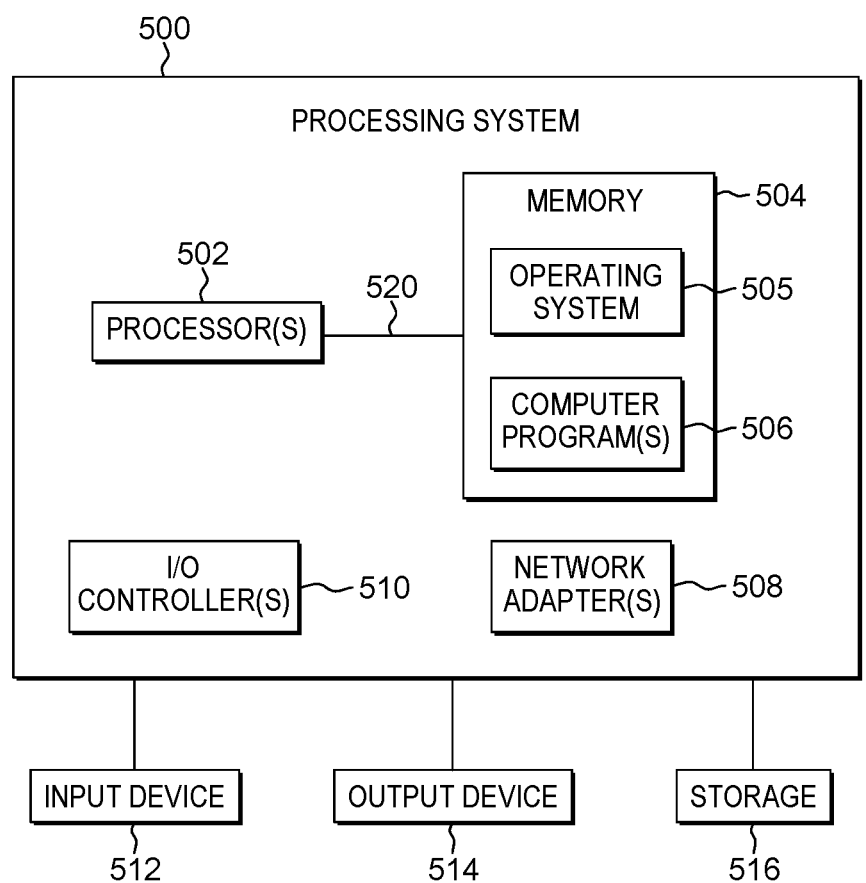
FIG. 5 depicts an example of a computer system to incorporate and use aspects described herein.

FIG. 5 depicts one example of a computer system to incorporate and use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapters 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer system.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance, virtualization device, storage controller, etc.

Figure 6:
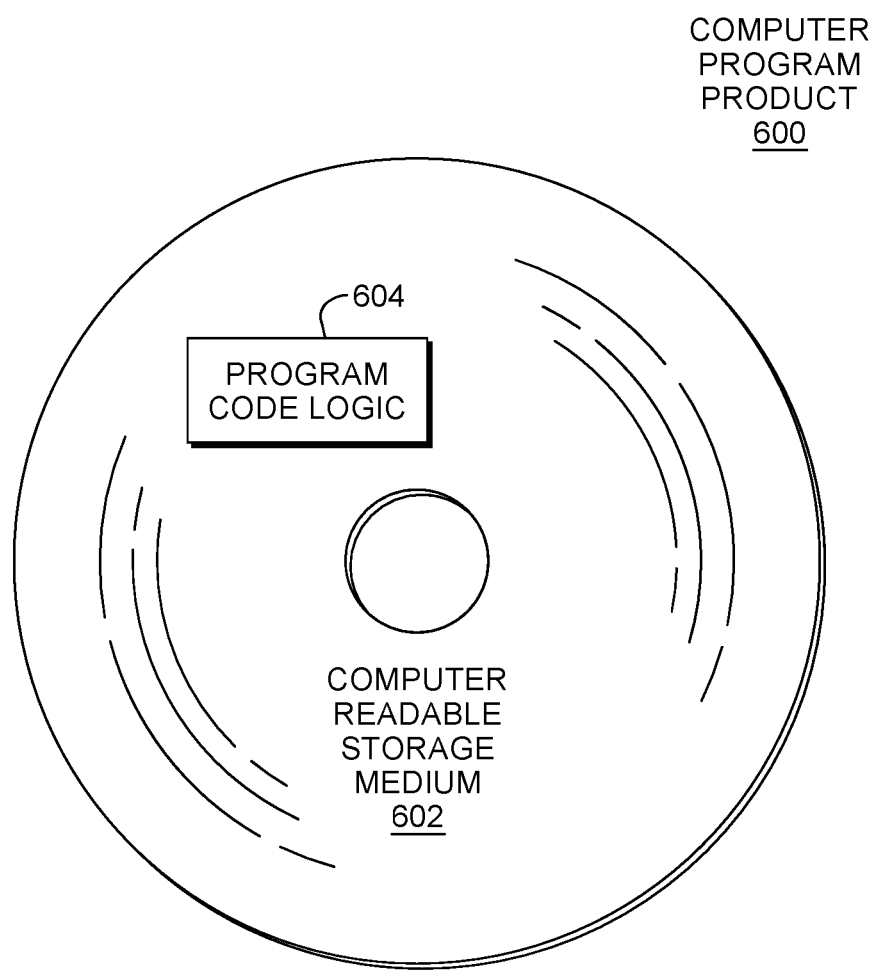
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   detecting an angle between a first physical display and a second physical display, an end of the first physical display being adjacent to an end of the second physical display and defining the angle;
   based on detecting the angle, establishing (i) a first physical display plane on the first physical display, (ii) a second physical display plane on the second physical display, and (iii) a plurality of virtual display planes on the first physical display and the second physical display, wherein the first physical display displays the first physical display place and at least one virtual display plane of the plurality of virtual display planes, and the second physical display displays the second physical display plane and at least one virtual display plane of the plurality of virtual display planes; and
   presenting a different video feed of a plurality of video feeds in each of the first physical display plane, the second physical display plane, and a first virtual display plane of the plurality of virtual display planes.

2. The method of claim 1, wherein the video feed presented in the first physical display plane comprises a video feed of a first video-conference participant, the video feed presented in the second physical display plane comprises a video feed of a second video-conference participant, and the video feed presented in the first virtual display plane comprises a video feed of a third video-conference participant, and wherein the establishing and presenting implement a virtual round-table meeting among a user and the first, second, and third video-conference participants.

3. The method of claim 2, further comprising presenting meeting content in a second virtual display plane of the plurality of virtual display planes.

4. The method of claim 1, wherein one video feed of the plurality of video feeds is presented spanning the first physical display and the second physical display in a pair of adjacent virtual display planes of the plurality of virtual display planes, with one virtual display plane of the pair being displayed on the first physical display and the other virtual display plane of the pair being displayed on the second physical display.

5. The method of claim 1, further comprising determining a respective different video feed, of the plurality of video feeds, to present in each of the first physical display plane, second physical display plane, and first virtual display plane, wherein the determining is based on (i) a pre-configured default, or (ii) a mapping, by a user, of each different video feed to a respective display plane of the first physical display plane, second physical display plane, and first virtual display plane.

6. The method of claim 1, wherein the first physical display and the second physical display are part of a single flexible display to which flexion is applied, the flexion imparting a bend in the flexible display along a bend line forming the angle and defining (i) the first physical display in a first region of the flexible display and (ii) the second physical display in a second region of the flexible display.

7. The method of claim 1, wherein each different video feed of the plurality of video feeds is from a respective different camera of a set of cameras at different locations remote from each other.

8. The method of claim 1, wherein the detecting the angle comprises determining the angle based on signals from proximity devices of the first physical display and second physical display.

9. The method of claim 1, further comprising:
imaging a scene proximate the first and second physical displays;
extrapolating an extension of a feature of the scene; and
for each display plane of the first physical display plane, second physical display plane, and first virtual display plane, presenting a respective portion of the extrapolated extension of the feature, the presenting providing to a viewer of the first physical display and second physical display continuity of the feature in the first physical display plane, second physical display plane, and first virtual display plane.

10. A computer system comprising:
a memory; and
a processor in communications with the memory, wherein the computer system is configured to perform a method, the method comprising:
detecting an angle between a first physical display and a second physical display, an end of the first physical display being adjacent to an end of the second physical display and defining the angle;
based on detecting the angle, establishing (i) a first physical display plane on the first physical display, (ii) a second physical display plane on the second physical display, and (iii) a plurality of virtual display planes on the first physical display and the second physical display, wherein the first physical display displays the first physical display plane and at least one virtual display plane of the plurality of virtual display planes, and the second physical display displays the second physical display plane and at least one virtual display plane of the plurality of virtual display planes; and
presenting a different video feed of a plurality of video feeds in each of the first physical display plane, the second physical display plane, and a first virtual display plane of the plurality of virtual display planes.

11. The computer system of claim 10, wherein the video feed presented in the first physical display plane comprises a video feed of a first video-conference participant, the video feed presented in the second physical display plane comprises a video feed of a second video-conference participant, and the video feed presented in the first virtual display plane comprises a video feed of a third video-conference participant, and wherein the establishing and presenting implement a virtual round-table meeting among a user and the first, second, and third video-conference participants.

12. The computer system of claim 11, wherein the method further comprises presenting meeting content in a second virtual display plane of the plurality of virtual display planes.

13. The computer system of claim 10, wherein one video feed of the plurality of video feeds is presented spanning the first physical display and the second physical display in a pair of adjacent virtual display planes of the plurality of virtual display planes, with one virtual display plane of the pair being displayed on the first physical display and the other virtual display plane of the pair being displayed on the second physical display.

14. The computer system of claim 10, wherein the method further comprises determining a respective different video feed, of the plurality of video feeds, to present in each of the first physical display plane, second physical display plane, and first virtual display plane, wherein the determining is based on (i) a pre-configured default, or (ii) a mapping, by a user, of each different video feed to a respective display plane of the first physical display plane, second physical display plane, and first virtual display plane.

15. The computer system of claim 10, wherein the first physical display and the second physical display are part of a single flexible display to which flexion is applied, the flexion imparting a bend in the flexible display along a bend line forming the angle and defining (i) the first physical display in a first region of the flexible display and (ii) the second physical display in a second region of the flexible display.

16. The computer system of claim 10, wherein the method further comprises:
imaging a scene proximate the first and second physical displays;
extrapolating an extension of a feature of the scene; and
for each display plane of the first physical display plane, second physical display plane, and first virtual display plane, presenting a respective portion of the extrapolated extension of the feature, the presenting providing to a viewer of the first physical display and second physical display continuity of the feature in the first physical display plane, second physical display plane, and first virtual display plane.

17. A computer program product comprising:
a computer readable storage medium readable by a processor and storing instructions for execution by the processor for performing a method comprising:
detecting an angle between a first physical display and a second physical display, an end of the first physical display being adjacent to an end of the second physical display and defining the angle;
based on detecting the angle, establishing (i) a first physical display plane on the first physical display, (ii) a second physical display plane on the second physical display, and (iii) a plurality of virtual display planes on the first physical display and the second physical display, wherein the physical display displays the first physical display plane and at least one virtual display plane of the plurality of virtual display planes, and the second physical display displays the second physical display plane and at least one virtual display plane of the plurality of virtual display planes; and
presenting a different video feed of a plurality of video feeds in each of the first physical display plane, the second physical display plane, and a first virtual display plane of the plurality of virtual display planes.

18. The computer program product of claim 17, wherein the first physical display and the second physical display are part of a single flexible display to which flexion is applied, the flexion imparting a bend in the flexible display along a bend line forming the angle and defining (i) the first physical display in a first region of the flexible display and (ii) the second physical display in a second region of the flexible display.

19. The computer program product of claim 18, wherein the video feed presented in the first physical display plane comprises a video feed of a first video-conference participant, the video feed presented in the second physical display plane comprises a video feed of a second video-conference participant, and the video feed presented in the first virtual display plane comprises a video feed of a third video-conference participant, and wherein the establishing and presenting implement a virtual round-table meeting among a user and the first, second, and third video-conference participants.

20. The computer program product of claim 17, wherein the method further comprises:
- imaging a scene proximate the first and second physical displays;
- extrapolating an extension of a feature of the scene; and
- for each display plane of the first physical display plane, second physical display plane, and first virtual display plane, presenting a respective portion of the extrapolated extension of the feature, the presenting providing to a viewer of the first physical display and second physical display continuity of the feature in the first physical display plane, second physical display plane, and first virtual display plane.

* * * * *